US012595043B2

(12) United States Patent
Thomas et al.

(10) Patent No.: US 12,595,043 B2
(45) Date of Patent: Apr. 7, 2026

(54) FLIGHT CONTROL SYSTEM

(71) Applicant: ANIMAL DYNAMICS LTD, Oxford (GB)

(72) Inventors: Adrian Thomas, Oxford (GB); Simon Gilbert, Oxford (GB)

(73) Assignee: Animal Dynamics Ltd, Oxford (GB)

( * ) Notice: Subject to any disclaimer, the term of this patent is extended or adjusted under 35 U.S.C. 154(b) by 0 days.

(21) Appl. No.: 17/631,881

(22) PCT Filed: Jul. 31, 2020

(86) PCT No.: PCT/GB2020/051837
§ 371 (c)(1),
(2) Date: Jan. 31, 2022

(87) PCT Pub. No.: WO2021/019250
PCT Pub. Date: Feb. 4, 2021

(65) Prior Publication Data
US 2022/0274700 A1 Sep. 1, 2022

(30) Foreign Application Priority Data
Aug. 1, 2019 (GB) ...................................... 1911004

(51) Int. Cl.
*B64C 39/02* (2023.01)
*B64C 13/16* (2006.01)
(Continued)

(52) U.S. Cl.
CPC ............ *B64C 39/024* (2013.01); *B64C 13/16* (2013.01); *H02P 6/06* (2013.01); *B64U 10/13* (2023.01); *B64U 10/40* (2023.01)

(58) Field of Classification Search
CPC ..... B64C 39/024; B64C 13/16; B64C 39/005; B64C 39/028; B64C 39/02; H02P 6/06;
(Continued)

(56) References Cited

U.S. PATENT DOCUMENTS 10,338,608 B2 * 7/2019 Wang ..................... G05D 1/102
10,475,306 B1 * 11/2019 Bender .............. G08B 13/1436
(Continued)

FOREIGN PATENT DOCUMENTS

CN 105366050 A 3/2016
EP 2865598 A1 4/2015
(Continued)

OTHER PUBLICATIONS

Search Report issued by the UK Intellectual Property Office in Appl. No. GB1911004.8, dated Dec. 20, 2019, 2 pages.
(Continued)

*Primary Examiner* — Yonel Beaulieu
(74) *Attorney, Agent, or Firm* — Bochner PLLC; Andrew D. Bochner

(57) ABSTRACT
A flight control system (20) comprising: • at least one drive unit (4); • at least one wing (5) operatively connected to the at least one drive unit; and • a controller (21) configured to: • send a control signal to the at least one drive unit to operate the at least one drive unit through a demanded motion; • receive a feedback signal indicative of the actual motion of the at least one drive unit; and • compare the actual motion to the demanded motion to determine a motion error of the at least one drive unit.

17 Claims, 5 Drawing Sheets

Figure 1:
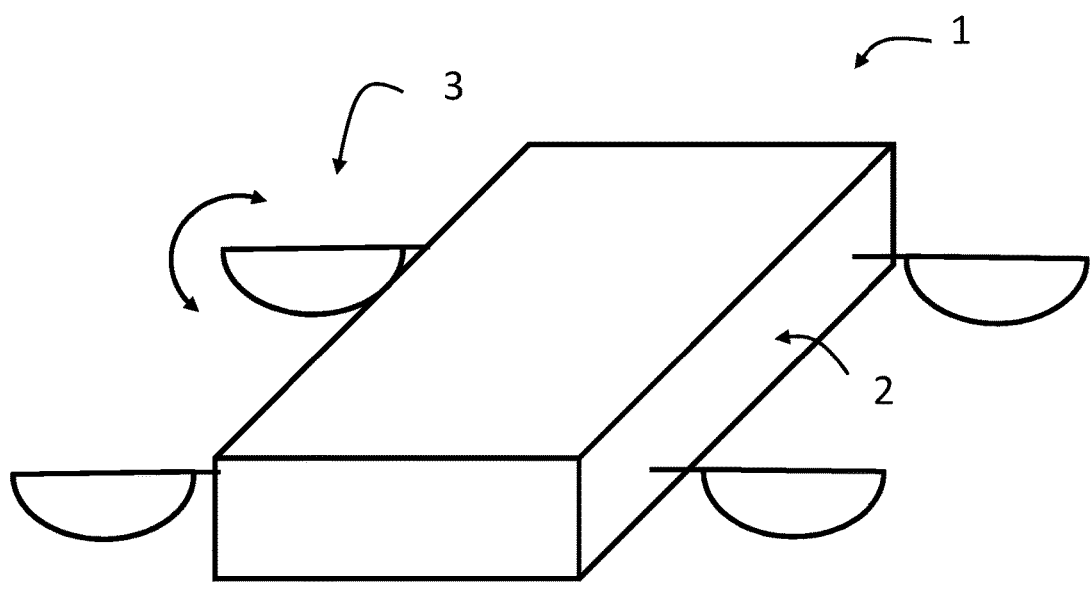

(51) Int. Cl.
B64U 10/13 (2023.01)
B64U 10/40 (2023.01)
H02P 6/06 (2006.01)

(58) Field of Classification Search
CPC ........ B64U 10/13; B64U 10/40; B64U 50/19; B64U 2201/00
See application file for complete search history.

(56) References Cited

U.S. PATENT DOCUMENTS

| | | | |
|---|---|---|---|
| 10,514,708 B2 * | 12/2019 | Cheng | G05D 1/101 |
| 10,642,285 B2 * | 5/2020 | Artemiadis | G05D 1/104 |
| 10,775,786 B2 * | 9/2020 | Abuhasira | G05B 13/042 |
| 11,124,289 B2 * | 9/2021 | McCullough | G05D 1/0808 |
| 11,146,116 B2 * | 10/2021 | Oqab | B64U 50/19 |
| 11,216,661 B2 * | 1/2022 | Xue | G06V 20/13 |
| 11,337,116 B2 * | 5/2022 | Aydin | B64C 39/024 |
| 11,420,534 B1 * | 8/2022 | Palombini | G06N 20/00 |
| 11,463,035 B2 * | 10/2022 | You | H01M 8/04753 |
| 11,467,572 B2 * | 10/2022 | Yanagisawa | G05D 1/101 |
| 11,482,118 B1 * | 10/2022 | Nealy | G08G 5/0004 |
| 2002/0117583 A1 | 8/2002 | Hamamoto et al. | |
| 2018/0081351 A1 | 3/2018 | Tankersley | |
| 2018/0307231 A1 | 10/2018 | Sorton | |
| 2019/0023392 A1 | 1/2019 | Micros | |
| 2019/0207543 A1 | 7/2019 | Lan | |

FOREIGN PATENT DOCUMENTS

| | | | |
|---|---|---|---|
| WO | 2003004122 A1 | 1/2003 | |
| WO | 2016167865 A1 | 10/2016 | |

OTHER PUBLICATIONS

International Search Report and Written Opinion of The International Searching Authority issued in International Appl. No. PCT/GB2020/051837, dated Oct. 28, 2020, 15 pages.

* cited by examiner

3C

3D

41

3A

3B

40

FLIGHT CONTROL SYSTEM

DESCRIPTION OF INVENTION

Conventional unmanned aerial vehicles (UAVs) are provided with a plurality of motors, each with a rotor attached. Rotating the rotors with the motors produces lift for the UAV. The speed (and, in some UAVs, the angle) of the motors can be individually controlled, to maneuver the UAV, providing yaw, pitch and roll control.

Recently, UAVs which create lift by flapping a set of wings, rather than rotating a set of rotors, have been developed. Each wing may be connected to an actuator, such as a rotary drive unit, which oscillates the wing back and forth.

The controller sends a control signal to the motor to move through a demanded angular displacement. The demanded angular displacement may be one which has been determined to provide the required lift. In still air, the motion of the wing in response to the control signal may be substantially predictable and determined by, for example, inertial loads, friction losses and/or aerodynamic loads on the wing. These factors can be calculated or estimated in advance, may be substantially constant, and can be substantially accounted for when forming the control signal.

In use, a UAV is affected by various factors which may affect the aerodynamic loading on the wing, causing the UAV to veer off the intended flight path and/or moving from its intended position and/or attitude. Such factors may include, for example, rapid changes in air pressure, temperature and/or density, turbulence, gusts and/or mechanical factors. These factors may generally be referred to herein as disturbances. A closed feedback loop may be adopted which seeks to correct for any unwanted disturbances.

To detect one or more of the disturbances, the UAV airframe may be fitted with one or more sensors which may detect an undesired change in attitude, position and/or motion of the UAV. For example, the UAV may be provided with sensors which detect accelerations and/or rotations of the UAV. When an undesired change in attitude is detected (e.g. when the change in attitude exceeds a tolerable threshold), the controller of the UAV may seek to correct for it by sending a compensating signal to one or more of the motors. For example, if a disturbance caused the UAV to roll to the left, then a signal may be sent to the thrust generators to roll the UAV back to the right to a corresponding extent, to restore the attitude.

A problem with this known system is that the attitude of the UAV must first be allowed to change to a predetermined level (e.g. up to or beyond a measurable and/or tolerable threshold), before it can be measured and corrected for. Although the detection and subsequent compensation may occur relatively quickly, it may still take at least a few operations of the motor before the change in attitude is detected and a corrective signal is sent to the motor(s). Such closed feedback systems, with an internal lag, can exhibit hysteresis, which is undesirable as it may affect the control of the UAV.

Moreover, in a conventional UAV which comprises rotors, rotational inertia of the rotors may adversely affect the ability for the UAV to react to disturbances. Such systems do not generally permit rapid changes in the velocity of the rotor, which may adversely affect the ability of the UAV to be stable and controllable in an environment with many and/or large disturbances (e.g. high winds).

The present invention seeks to address at least some of the above problems.

The present invention provides a flight control system comprising:

at least one drive unit;

at least one wing operatively connected to the at least one drive unit; and a controller configured to:

send a control signal to the at least one drive unit to operate the at least one drive unit through a demanded motion;

receive a feedback signal indicative of the actual motion of the at least one drive unit; and compare the actual motion to the demanded motion to determine a motion error of the at least one drive unit.

In at least one embodiment, the at least one wing is directly connected to the at least one drive unit.

In at least one embodiment, the at least one wing is connected to the at least one drive unit via a gear arrangement.

In at least one embodiment, the at least one drive unit is configured to send a feedback signal indicative of the actual motion of the at least one drive unit to the controller.

In at least one embodiment, the flight control system further comprises an encoder associated with the at least one drive unit configured to send a feedback signal indicative of the actual motion of the at least one drive unit to the controller In at least one embodiment, the controller is further configured to:

send a compensating signal to the at least one drive unit based on the motion error.

In at least one embodiment, the controller is configured to send a compensating signal to the at least one drive unit only if the determined motion error is greater than a predetermined value.

In at least one embodiment, the compensating signal is to operate the at least one drive unit through a compensating motion equal to the motion error.

In at least one embodiment, the controller is configured to send the control and compensating signals to the at least one drive unit during the same operation of the drive unit.

In at least one embodiment, the controller is configured to send the control signal during a first operation of the drive unit and to send the compensating signal during a subsequent operation of the wing.

In at least one embodiment, the motion is displacement.

In at least one embodiment, the motion is one of velocity and acceleration.

In at least one embodiment, the drive unit is a rotary drive unit, and the motion is one of angular displacement, angular velocity, angular acceleration, rate of rotation and rotary acceleration.

In at least one embodiment, the wing is a substantially planar wing, pivotably connected to the rotary drive unit about a wrist axis which is angled with respect to the rotational axis of the rotary drive unit.

In at least one embodiment, the wrist axis is substantially perpendicular to the rotational axis of the rotary drive unit.

In at least one embodiment, the planar wing is confined to rotate about the wrist axis within a predetermined range.

In at least one embodiment, the rotary drive unit is configured to oscillate.

In at least one embodiment, the controller is configured to operate the at least one drive unit through a plurality of operations, and to store the determined motion error for each operation.

In at least one embodiment, the flight control system comprises a plurality of drive units, the controller connected to each of said plurality of drive units, and configured to:
  send a first control signal to a first drive unit to operate the first drive unit through a demanded motion;
  receive a feedback signal indicative of the actual motion of the first drive unit;
  compare the actual motion to the demanded motion to determine a motion error of the first drive unit; and
  send a second control signal to at least another of the plurality of drive units based on the motion error of the first drive unit.

In at least one embodiment, the flight control system comprises a plurality of drive units, the controller connected to each of said plurality of drive units, and configured to:
  send a first control signal to each drive unit to operate each drive unit through a respective demanded motion;
  receive a feedback signal indicative of the actual motion of each of the drive units; and
  compare the actual motion to the demanded motion of each drive unit to determine a motion error for each drive unit.

In at least one embodiment, the controller is further configured to compare the motion error for each drive unit to estimate, determine or categorise a cause of the motion error.

In at least one embodiment, the controller is configured to operate a plurality of drive units through a plurality of operations, and to store the determined motion error for each operation for each drive unit, the controller being further configured to compare the stored motion errors for one drive unit to the stored motion errors for another drive unit.

In at least one embodiment, the controller is configured to perform at least one of the following operations if the determined motion error is greater than a predetermined value:
  a) send an alarm signal to a user;
  b) prevent further operation of the at least one drive unit; and
  c) when the flight control system is operatively connected to a vehicle incorporating said at least one drive unit, sending a signal to the vehicle to proceed to a predetermined location.

Figure 2:
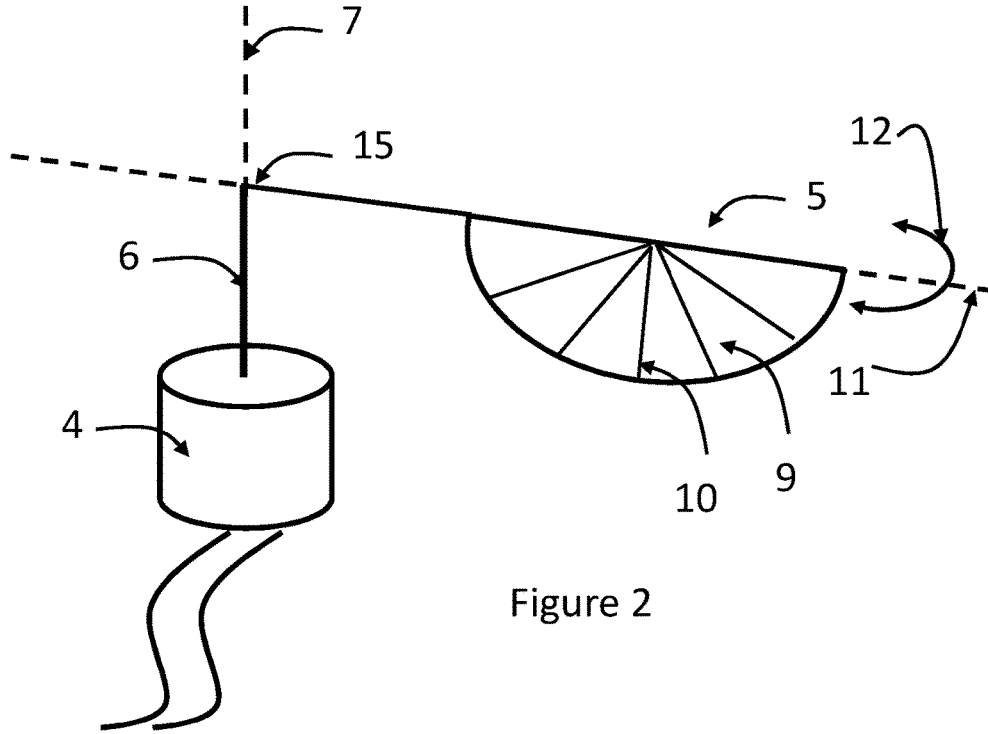
Figure 3:
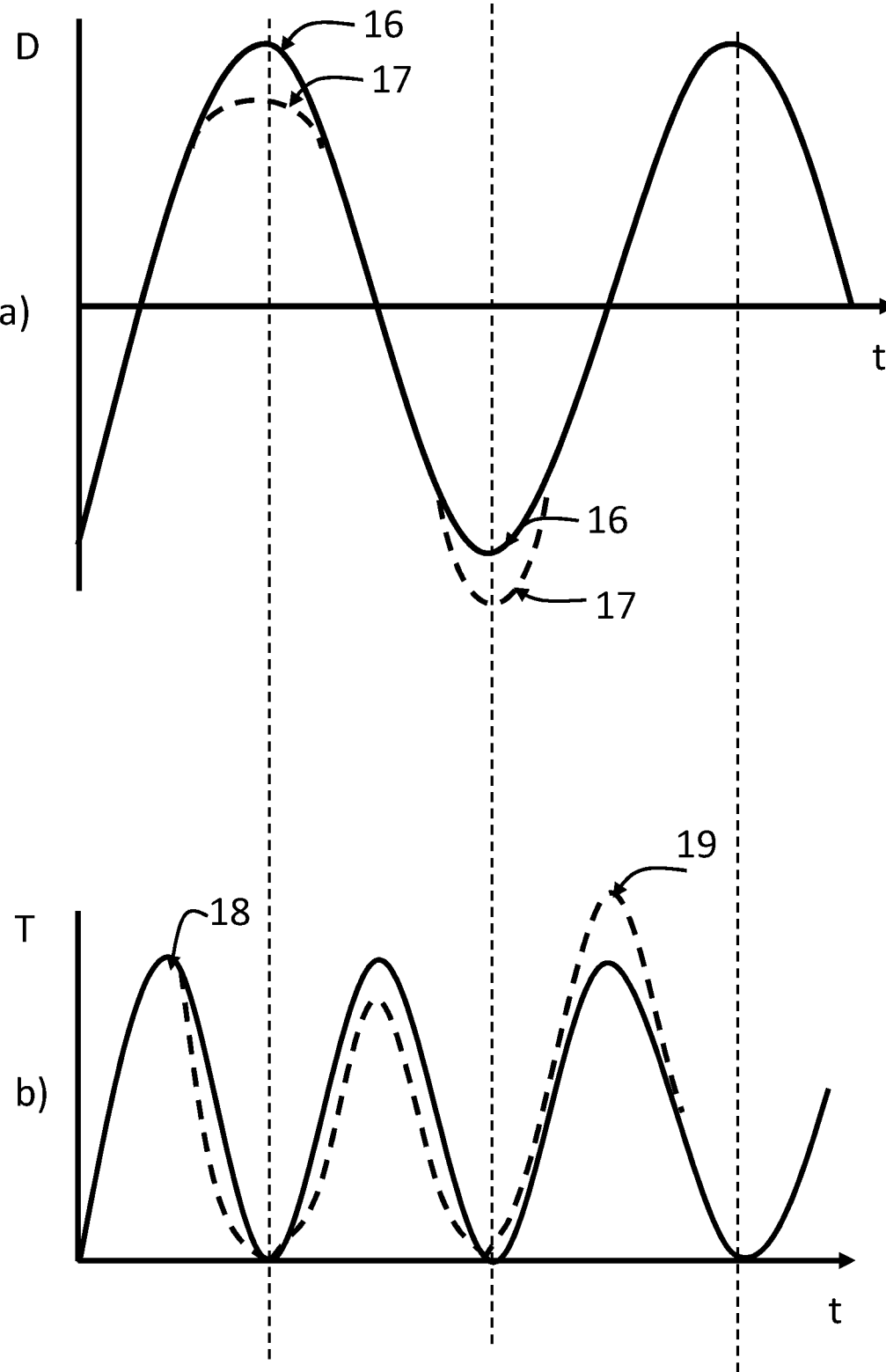
Figure 4:
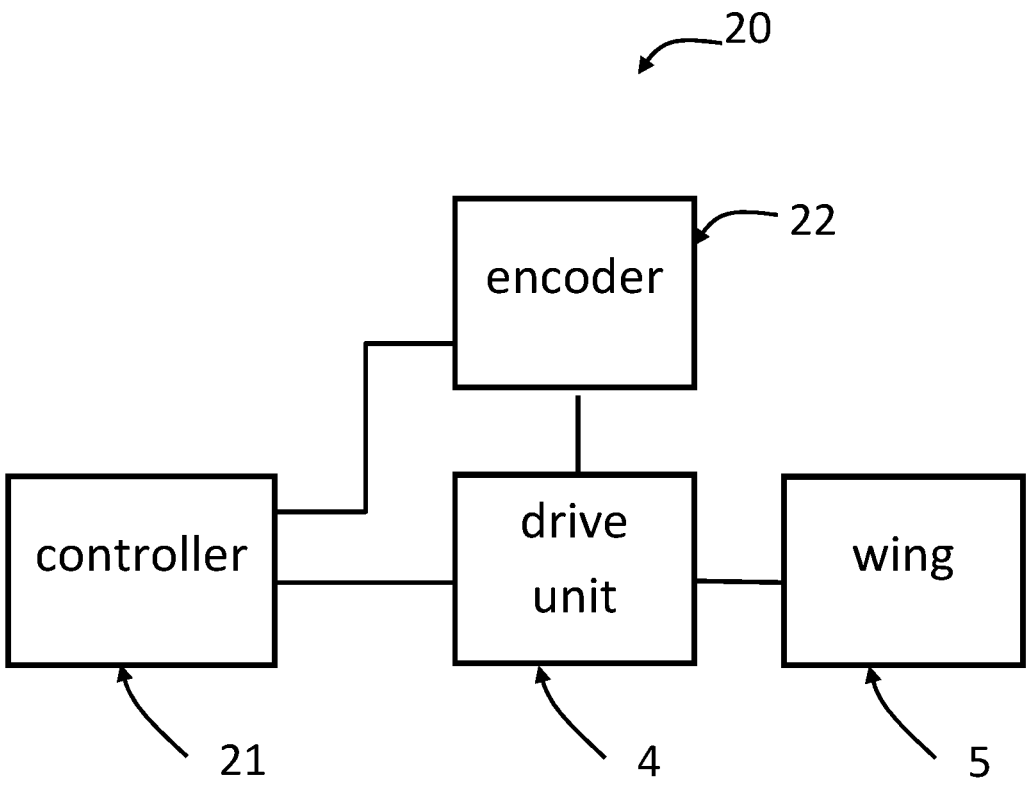
Figure 5:
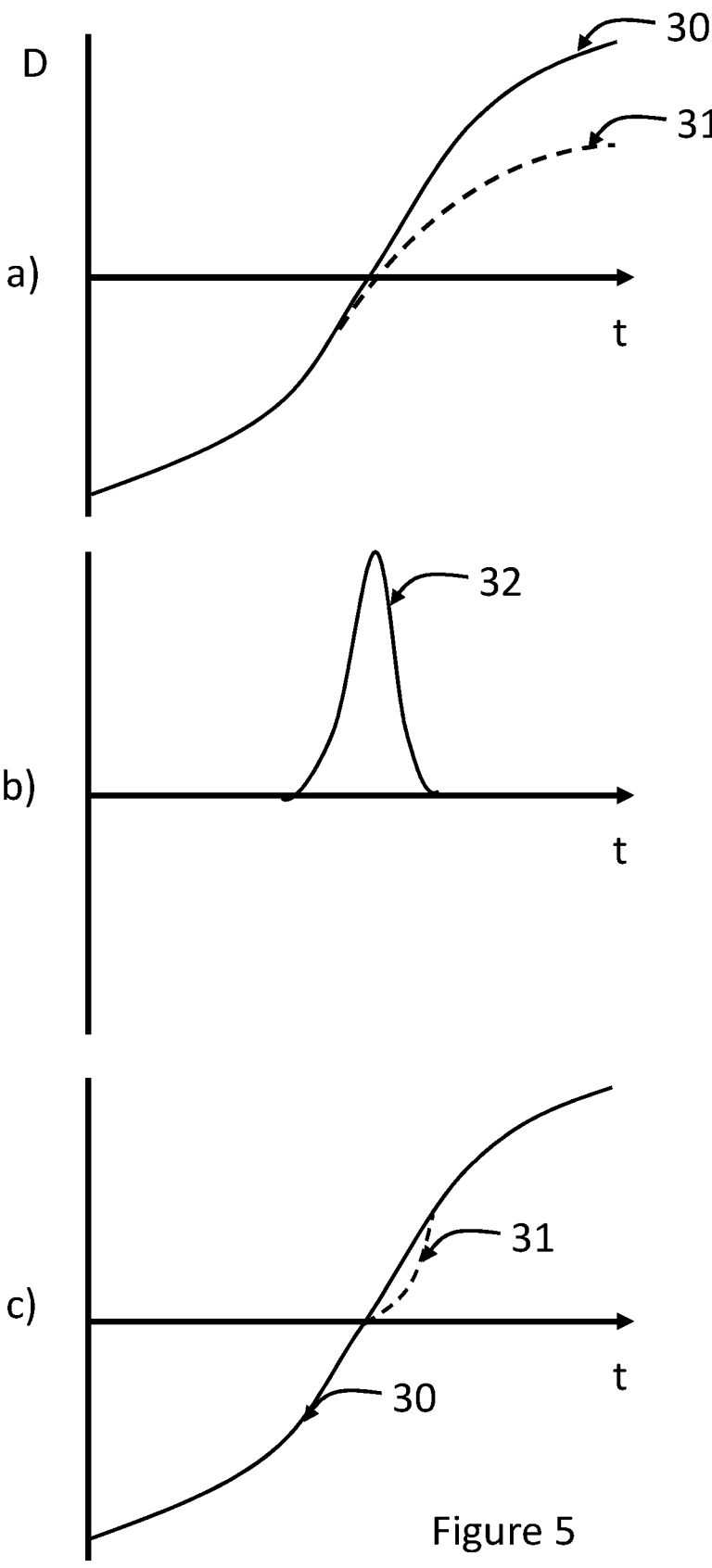
Figure 6:
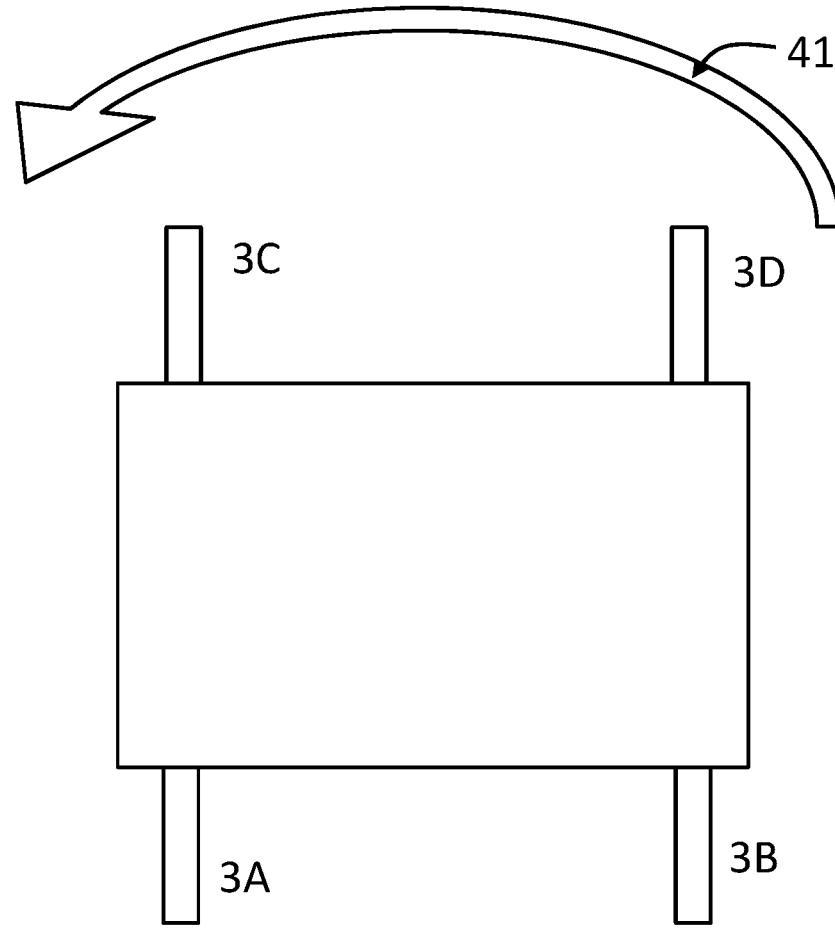

Embodiments of the present invention will now be described, by way of non-limiting example only, with reference to the Figures in which:

FIG. 1 schematically illustrates an unmanned aerial vehicle (UAV) of the type for use with the flight control system of the present invention;

FIG. 2 schematically illustrates a rotary drive unit and wing of the UAV in FIG. 1;

FIG. 3 schematically illustrates the displacement of a drive unit and the corresponding lift created thereby in use;

FIG. 4 schematically illustrates a flight control system according to the present invention;

FIG. 5 schematically illustrates the displacement of a drive unit of a flight control system embodying the present invention; and FIG. 6 schematically illustrates a plan view of a UAV and schematically illustrates winds acting on the UAV.

FIG. 1 illustrates an unmanned aerial vehicle (UAV) 1 of the type for use with the claimed invention. The UAV 1 comprises an airframe 2 and a plurality of thrust generators 3. In the arrangement shown, the UAV 1 comprises four thrust generators 3. The thrust generators 3 are distributed at both ends and either side of the air frame 2, such that the center of gravity of the UAV 1 may substantially be in the centre of the airframe 2. Located on/in the airframe 2 may be a controller, power supply, sensor(s) and/or various other components (not shown). A user may require the UAV 1 to offer conventional flight controls for the yaw, roll and pitch axes. The airframe 2 of the UAV 1 may generally be maintained in a substantially horizontal attitude in use, or at an angle to the horizontal.

In the UAV 1 shown, there are four thrust generators 3. In other embodiments, there may be more, or fewer, thrust generators 3. The number of thrust generators 3 is not essential to the claimed invention. As will become apparent below, a flight control system embodying the present invention may equally be adopted with a UAV which utilizes conventional rotors rather than a flapping wing.

FIG. 2 schematically illustrates one of the thrust generators 3 of the UAV 1 shown in FIG. 1. Thrust generator 3 comprises a drive unit 4 and a wing 5 which is operatively connected to the drive unit 4. In the embodiment shown, the drive unit 4 comprises a conventional motor. In embodiments of the present invention, the motor 4 may be a brushless motor. The motor 4 may comprise a spindle 6 which is caused to rotate by providing power to the motor 4. The polarity of the power supplied to the motor 4 determines the direction of rotation of the spindle 6. The power supplied to the motor 4 may determine the angular velocity of the spindle 6. In the embodiment shown in FIG. 2, the wing 5 is directly connected to the spindle 6 of the motor 4. The spindle 6 rotates about a rotational axis 7.

The wing 5 may comprise a spar 8, wing skin 9 and a plurality of ribs 10. The ribs 10 are attached to the spar 8. The wing skin 9 is secured to at least the ribs 10, so as to provide a surface of the wing 5. The wing 5 may be substantially planar The wing 5, via the spar 8, is connected to the spindle 6 of the motor 4. The wing 5 may be connected to the spindle 6 of the motor 4 by a wrist joint 15. The wing may pivot with respect to the spindle 6 about a wrist axis 11. The wrist axis 11 may be angled with respect to the rotational axis 7 of the spindle 6 of the motor 4. In the embodiment shown in FIG. 2, the wrist axis 11 is substantially perpendicular to the rotational axis 7 of the spindle 6 of the motor 4.

In use, if an oscillating signal is sent to the motor 4, the wing 5 is caused to flap about an arc illustrated by numeral 12 in FIG. 2. In one embodiment, the wing 5 is able to rotate about the wrist axis 11. For example, the spar 8 may be received in the wrist joint 15 with a journaled connection. The angle of the plane of the wing surface 9 relative to a horizontal plane when the wing 5 is moving in one direction may be different to the angle between the plane of the wing surface 9 and the horizontal plane when the wing 5 is moving in the opposing direction. In one embodiment, the spar 5, or the wing surface 9 adjacent the spar 5, acts as the leading edge of the wing. The angle of the plane of the wing surface 9 relative to the horizontal plane provides the angle of attack of the wing 5 and therefore the lift provided by the wing 5 as it moves. The angle of the wing surface 9 relative to the horizontal plane may not be actively controlled. Rather, it may be passively controlled by moving/sweeping the wing 5 through the air.

Generally, a flight control system embodying the present invention is configured to make adjustments to the drive unit in response to detecting a disturbance, such as a gust, during the operation of the drive unit. As noted above, known control systems are configured to make adjustments to the drive unit by detecting and responding to changes in vehicle attitude/velocity/rotation rates. There is an inherent lag in the detection of such changes. With a flight control system embodying the present invention, the lag may be reduced or substantially eliminated. A flight control system embodying the present invention may be configured to correct for a disturbance within the same phase in which it occurs.

A flight control system embodying the present invention sends a signal to a drive unit to operate it through a demanded motion. That motion may comprise, for example, displacement, velocity, or acceleration. When the drive unit is a rotary drive unit, the motion may be, for example, angular displacement, angular velocity, angular acceleration, rate of rotation or rotary acceleration.

In effect, the drive unit is commanded/demanded to perform a motion, and if it is determined that the actual motion is different to what was commanded/demanded, the difference between the two (the error) is determined.

In the embodiment described below, the motion is angular displacement. However, it will readily be appreciated how the invention applies to other forms of motion, including those examples noted above.

Turning to FIG. 3, the solid line 16 in graph a) schematically illustrates a desired (demanded) displacement of the motor spindle 7 over time.

The Y axis illustrates the position D relative to a central home position of the wing (i.e. the centre of the angular range through which the wing 5 may move). Oscillating the motor causes the wing to move in either direction away from the central position. In FIG. 3a), the wing starts at its maximum distance away from the central position. It then sweeps back in the opposite direction, through the central position (where D crosses the X axis) and towards the maximum distance in the other direction. This is referred to herein as an operation. The process continues, with multiple more operations. During each operation, the wing moves in the opposite direction to that of the preceding operation (in a flapping wing embodiment)

In the embodiment shown, the displacement (D) over time (t) generally takes the form of a sinusoidal wave. This is not essential. The wave may take any other form, including but not limited to square wave, saw tooth, etc. Due to the nature of the displacement following a wave pattern, in the embodiment illustrated in FIG. 3, it will be noted that each cycle of displacement (i.e. the drive unit moving the wing in one direction, and then back in the opposing direction) comprises two operations.

The term operation is used to encompass a single flap (i.e. a half cycle) of an embodiment adopting a sinusoidally flapping wing on a motor. The term operation is also used to encompass a single rotation of a rotor of an embodiment in which the rotor rotates in the same direction with each operation/rotation.

The precise shape and parameters of the control signal sent to the drive unit 4 to move the drive unit 4 through a demanded displacement is not essential. The invention is instead directed to address when the drive unit 4 is not displaced to the extent required, as will be described in detail below.

As noted above, in use, a wing 5 may be affected by disturbances including, for example, rapid changes in air pressure, temperature and/or density, turbulence, gusts and/or mechanical factors.

In FIG. 3(a), the dotted line 17 schematically illustrates the actual displacement of a drive unit 4 with respect to time, when subjected to a disturbance.

The solid line 18 in FIG. 3(b) indicates the anticipated thrust which should be provided by the demanded displacement illustrated in FIG. 3(a).

In use, however, one or more disturbances may prevent the drive unit 4 from moving through the demanded displacement. The drive unit 4 may move less than the demanded displacement; or may move more than the demanded displacement. In either event, a consequence is that the wing may not deliver the level of lift required of it and/or may not be in an optimal starting position for the next operation.

The dotted line 19 in FIG. 3(a) also demonstrates the actual displacement, over time, of the motor 4 when the wing 5 is subjected to a disturbance. At the first peak shown in FIG. 3(a), a gust acting on the wing so as to oppose its direction of travel (a head wind) may increase the apparent velocity at the wing, which may reduce the wing beat amplitude at that point. At the second peak shown in FIG. 3(a), the opposite has occurred (tail wind decreases the apparent velocity, increasing the wing beat amplitude).

With reference to FIG. 3(b), it will be observed that, as a consequence of disturbance, the delivered lift 19 may not be in line with what was predicted and required.

The claimed invention is directed to identifying and optionally correcting for any errors in the displacement of the drive unit 4.

Accordingly, with reference to the schematic illustration of FIG. 4, the present invention provides a flight control system 20 comprising at least one drive unit 4; at least one wing 5 operatively connected to the at least one drive unit 4; and a controller 21. The controller 21 is configured to send a control signal to the at least one drive unit 4 to move the at least one drive unit 4 through a demanded displacement; receive a feedback signal indicative of the actual displacement of the at least one drive unit 4; and compare the actual displacement to the demanded displacement to determine a displacement error of the at least one drive unit.

In one embodiment, the drive unit 4, itself, is configured to send a feedback signal indicative of the actual displacement of the at least one drive unit 4 to the controller 21. The drive unit may be a brushless motor. The topology of certain motors comprises a position encoder, which may provide the feedback signal.

Alternatively, or additionally, the flight control system 20 may further comprise a separate position encoder 22 associated with the at least one drive unit 4 configured to send the feedback signal indicative of the actual displacement of the at least one drive unit 4 to the controller 21.

In the illustrated embodiment, the encoder is a position encoder, which may detect the displacement. In other embodiments, where the motion of interest is something other than displacement, a suitable encoder may be used. For example, the encoder may be a rate of rotation (e.g. RPM) encoder, or a velocity or acceleration encoder. The skilled person will appreciate that a position encoder can be used to measure the rate of rotation. The precise nature of the encoder is not important, but an encoder of a flight control system embodying the present invention may be operable to detect whatever motion is to be monitored.

Once the controller 21 has determined the displacement error, this can then be used to compensate for the error. Accordingly, the controller 21 of a flight control system 20 embodying the present invention may further be configured to send a compensating signal to the at least one drive unit 4 based on the displacement error. In one embodiment, the compensating signal is to move the at least one drive unit 4 through a compensating displacement equal to the displacement error. Accordingly, embodiments of the present invention may serve to substantially offset a determined displacement error.

In one embodiment, the controller 21 may be configured to send a compensating signal to the at least one drive unit 4 only if the determined displacement error is greater than a predetermined minimum value. In other words, small displacement errors may be tolerated. The predetermined value may be based on the demanded displacement. For example, if the determined displacement error is less than a predetermined percentage of the demanded displacement, a compensating signal may not be sent.

In some situations, a high displacement error may be determined, which is greater than a predetermined maximum value. A high displacement error may be one in which is the determined displacement error is greater than a predetermined percentage of the demanded displacement. Such a situation may indicate, for example, that there is a mechanical malfunction with one of the components; communication with the drive unit has been affected/lost; or at least one wing has been subjected to an extreme disturbance. Other factors may lead to the determined displacement error being greater than a predetermined maximum value.

The control system may assess the determined displacement error over at least a few cycles to determine an average determined displacement error. The average determined displacement error may be compared to the predetermined maximum value.

The predetermined maximum value may be set according to the capability of the at least one drive unit and wing. For example, the at least one drive unit and wing may only be capable of compensating for a determined displacement error up to the predetermined maximum value.

When the determined displacement error is greater than a predetermined value, the controller may be configured to send an alarm signal to a user, to alert them of an issue. The flight control system may otherwise continue to operate. Alternatively (or if the displacement error is greater than an upper limit), further operation of the at least one drive unit may be prevented. The at least one drive unit may be shut down, leaving the other drive units and wings to operate the vehicle alone. Performance of the vehicle may then be restricted. Alternatively, if the displacement error is such that further operation of the vehicle is not possible/safe, the vehicle may be instructed to return to a predetermined location. For example, the vehicle may be instructed to return to a home/service location, for investigation (limp home). Alternatively, the vehicle may be instructed to land at the nearest safe location (emergency landing).

In one embodiment, the controller 21 is configured to send the control signal and corresponding compensating signals to the at least one drive unit 4 during the same operation of the drive unit 4. That is to say, when the drive unit is being driven from a starting position to a second position (equal to the demanded displacement), if the feedback signal indicates that the actual displacement, at a point in time, is not equal to the corresponding demanded displacement at that time, a compensating signal may be generated and sent to the drive unit 4 so as to compensate for the displacement error.

Accordingly, the flight control system 20 embodying the present invention may serve to substantially correct the displacement error during the same operation in which it was determined.

This is illustrated with reference to FIG. 5. The solid line 30 in graph (a) illustrates the demanded displacement and the dotted line 31 illustrates the actual displacement of a wing which is subjected to a disturbance. The difference between the two lines corresponds to the displacement error.

Graph (b) illustrates a compensating signal 33 which may be sent by a controller 21 to the drive unit 4. The compensating signal 33 may be sent at the point at which, or very shortly afterwards, the displacement error is first determined.

Graph (c) shows the same demanded displacement (solid line 30) as graph (a). However, the actual displacement (dotted line 31) of the drive unit 4 closely follows the demanded displacement 30, by virtue of a flight control system 20 embodying the present invention. This is because the flight control system 20 determined the displacement error, and sent a compensating signal to the drive unit 4 based on the displacement error, so that it would substantially correct for the error in the same operation. Consequently, at the end of the operation, the position of the drive unit 4 is substantially as intended. Consequently, the actual displacement substantially equals the demanded displacement, and therefore any of the disturbances affecting the drive unit have been substantially compensated for.

In use, it is inevitable that there may be some delay in the steps of: receiving the feedback signal indicative of the actual displacement; determining the displacement error; sending the compensating signal to the drive unit; and/or for the drive unit 4 to act on the compensation signal. It is preferable to minimize this inherent lag as much as possible.

In at least one embodiment, the feedback signal indicative of the actual displacement of the at least one drive unit 4 is received substantially in real time, such that the comparison between the actual displacement and the demanded displacement can be calculated substantially in real time.

In at least one embodiment, the controller 21 may be configured to send the control signal during a first operation of the drive unit 4, and to send the compensating signal during a subsequent operation of the drive unit 4. This is so that, rather than correct the displacement error within the same operation in which it may have occurred, the compensating signal may instead be sent to the drive unit 4 in the next operation. The cumulative effect over the two operations is that the cumulative displacement will match the demanded displacement. In at least one embodiment, the subsequent operation may be the next operation, or the third, fourth, fifth etc. operation.

In at least one embodiment, when a displacement error is detected during a first operation of the drive unit, the corresponding compensating signal may be delivered to the drive unit spread over a plurality of subsequent cycles. This may have a damping effect on the motion of the UAV, such that an extreme displacement error during one operation is not immediately followed by a compensating signal of the same magnitude during the next operation.

In at least one embodiment, the compensating signal is based entirely on the measured displacement error, so that it only serves to compensate the effects of the measured disturbance. In at least one embodiment, the compensating signal is based in part on the measured displacement error. Accordingly, in an embodiment where the controller is configured to operate the at least one drive unit through a plurality of operations, and to store the determined displacement error for each operation, the flight control system may seek to identify patterns/trends in the data, to predict what the displacement error may be on the next operation. Accordingly, the compensating signal may be based at least in part on a predicted displacement error.

A benefit of embodiments of the present invention is that they allow for the monitoring of the displacement error and the subsequent compensation of that error.

Such is the speed at which a flight control system 20 embodying the present invention might correct for the errors is that no observable or measurable change in attitude of the airframe 2 may be noticed. The problems with hysteresis, as noted above, may be avoided.

Although a rotary drive unit 4 has been described above, it will of course be appreciated that other actuators are possible. It will also be appreciated that, whilst the embodiment described above adopts a wing and oscillating drive unit, the benefits of the present invention may equally be applied to a conventional rotor UAV, in which the motors rotate in substantially the same direction. In a conventional rotor UAV, an operation in the sense used herein may relate to a single rotation of a rotor, a plurality of rotations or a part of a rotation. Regardless, it will be appreciated that a rotor will also be subjected to disturbances which may lead to a displacement error. Embodiments of the present invention can determine such displacement errors and send a compensating signal to the motor.

A rotor comprises a set of at least two wings. Therefore, references to a wing herein apply as much to a flapping wing, as described above, as to a/the wing(s) of a rotor.

In an embodiment comprising a rotary drive unit, the motion may be the rate of rotation. For example, the controller may be configured to:

send a control signal to the at least one drive unit to operate the at least one drive unit at a demanded rate of rotation;

receive a feedback signal indicative of the actual rate of rotation of the at least one drive unit; and compare the actual rate of rotation to the demanded rate of rotation to determine a rate of rotation error of the at least one drive unit.

It will be appreciated that the rate of rotation error will affect the lift provided by the rotor. A flight control system embodying the present invention is able to determine the error and send a compensating signal to substantially correct for the error. Preferably, the error may be determined and substantially corrected even before the known parameters denoting a disturbance (such as attitude of the airframe) become detectable.

A flight control system 20 embodying the present invention may be configured to operate a drive unit 4 through a plurality of operations, and to store the determined displacement error for each operation. Additionally, any compensating signal generated and sent to the drive unit may also be stored.

With reference to FIG. 3a, it will be noted that 3 operations of the drive unit are illustrated, or 1.5 cycles. As noted above, at the first peak shown in FIG. 3(a), a gust is acting on the wing so as to oppose its direction of travel (a head wind), which increases the apparent velocity at the wing, which may reduce the wing beat amplitude at that point (i.e. actual displacement is less than demanded displacement). At the second peak shown in FIG. 3(a), the opposite has occurred, in which a tail wind decreases the apparent velocity, increasing the wing beat amplitude (i.e. actual displacement is greater than demanded displacement). The gust acting on the wing during that cycle (two operations) may be of substantially the same speed and direction. It may be beneficial to receive and monitor the displacement error over each half-cycle of a cycle.

For example, if the actual displacement of a wing is the opposite to that shown in FIG. 3a increased wing beat amplitude at first peak, decreased wing amplitude at second peak this indicates a gust which is travelling in the opposite direction to that illustrated in FIG. 3a.

Moreover, the value of the displacement error over a cycle (two operations) can be used to categorise the gust. For example, if the actual displacement is greater than the demanded displacement during two consecutive half-cycles, this may be indicative of a downward gust (relative to the airframe 2). If the actual displacement is less than the demanded displacement during two consecutive half-cycles, this may be indicative of an upward gust (relative to the airframe 2).

The present invention further provides a flight control system comprising a plurality of drive units, the controller connected to each of said plurality of drive units, and configured to: send a first control signal to a first drive unit to move the first drive unit through a demanded displacement; receive a feedback signal indicative of the actual displacement of the first drive unit; compare the actual displacement to the demanded displacement to determine a displacement error of the first drive unit; and send a second control signal to at least another of the plurality of drive units based on the displacement error of the first drive unit.

This embodiment comprises a plurality of drive units 4. In some situations, rather than provide a compensating signal to the drive unit which exhibited a displacement error, the compensating signal, or a signal based on it, may instead be sent to another drive unit on the UAV, which it may be determined is better placed to correct for the effects of the displacement error on the UAV. It will also be appreciated that compensating signals may be sent to two or more of the other drive units.

Still further, another embodiment of the present invention provides a flight control system comprising a plurality of drive units, the controller connected to each of said plurality of drive units, and configured to: send a first control signal to each drive unit to move each drive unit through a respective demanded displacement; receive a feedback signal indicative of the actual displacement of each of the drive units; and compare the actual displacement to the demanded displacement of each drive unit to determine a displacement error for each drive unit.

By recording and comparing the displacement error for each drive unit of a UAV, particularly doing so over a number of operations, a flight control system 20 embodying the present invention may seek to identify patterns in the displacement error, either locally for a given drive unit 4, or globally over all of the drive units of the UAV 1.

Consequently, it may be possible for a controller 21 of a flight control system 20 embodying the present invention to compare the displacement error for each drive unit to estimate, determine or categorize a cause of the displacement error. Still further, the likely impact of a disturbance on another drive unit may be predicted.

FIG. 6 schematically illustrates a UAV having four thrust generating units 3. These may include wings or rotors.

When flying, the UAV may be subjected to various types of gust(s). Arrow 40 generally denotes a linear gust (i.e. a push gust). The other arrow, denoted by number 41, denotes a non-linear (i.e. a rotational) gust.

It will be appreciated that the linear gust 40 will first impact the first thrust generator 3a. A corresponding displacement error may be determined and adjusted for. A short time later, the 40 gust may then reach the second and/or third thrust generators 3b, 3c. Depending on the direction of the gust, and the attitude of the UAV, the gust may lead to a corresponding displacement error in the thrust generators 3b, 3c, at substantially the same time, or at slightly different times. Such information can be used to determine the likely direction of the gust.

Once a gust has been determined to affect the first 3a, second 3b and third 3c thrust generators, the timing and extent of the gust affecting those thrust generators 3a, 3b, 3c may be used to predict that the gust will then reach the fourth thrust generator 3*d*. If this is reliably determined, then a compensating signal can be sent to the fourth thrust generator 3*d* substantially so as to coincide with, if not even precede, the predicted impact of the gust on the fourth thrust generator 3*d*.

It will be appreciated that, in such an embodiment, even more reactive control of the flight control system 20 to disturbances is provided for.

The other arrow, denoted by number 41 denotes a circular gust. A circular gust may be one in which the gust does not follow a substantially linear path, but rather prescribes an arc. For example, particularly in the vicinity of a building or other physical object, wind may be caused to swirl due to eddy currents.

Embodiments of the present invention may provide for the characterization, and compensation for, such a circular gust 41. For example, if the same magnitude of displacement error is identified at a plurality of drive units 4, each separated by substantially the same time period, this may be indicative of a circular gust, and it may be predicted that the circular gust will soon reach the fourth thrust generator. As with the embodiments disclosed above, a compensating signal can be sent to the fourth thrust generator which substantially coincides with, or even precedes, the arrival of the gust at the thrust generator.

The exemplary gusts 40, 41 in FIG. 6 are shown as acting in the same plane as the UAV. This may not be the case. A gust may act in a plane which is non-parallel to that of the UAV, e.g. a non-horizontal plane. The UAV may also be subjected to more complex 3D gusts, including a vortex. A flight control system embodying the present invention is able to detect, characterise and compensate for such gusts.

As noted above, in some embodiments, the flight control system 20 may seek to identify patterns/trends in the data, to predict what the displacement error may be on the next operation. For example, if a displacement error is detected on at least one drive unit 4 which is identified as being indicative of a linear gust, based on historical data, the controller 21 may be able to send a compensating signal to the at least one drive unit 4 sooner than it may be able to without that historical data. The controller may be able to pre-empt a particular type of disturbance.

The prediction of disturbances may be improved by data from at least one other sensor. For example, data may be received from any of an altimeter (true and/or absolute), barometer, GPS and thermometer. Such data may help to predict the instances and/extent of any disturbances. For example, if an altimeter indicates that the vehicle is flying over terrain that is increasing in height rapidly (i.e. a hill), then the vehicle may be more likely to encounter an updraft. Similar terrain data may be received from a GPS unit in combination with a stored map. A decrease in temperature measured by a thermometer may also indicate that an updraft is likely, so that the controller can pre-empt the effects of an updraft in advance of it happening. Likewise, an increase in temperature may indicate that a downdraft is likely, and the controller may pre-empt its effects accordingly.

Generally, a flight control system embodying the present invention may be configured to recognise and characterise disturbances. This knowledge may then be used to inform the compensating signals sent to the at least one drive unit.

In embodiments described herein, the controller may be configured to determine the displacement error substantially all the time, or at least during each operation of the drive unit. Alternatively, the controller may only periodically determine the displacement error, for example at regular time intervals or after a predetermined number of cycles of the at least one drive unit. The controller may store and/or send the determined displacement error to a user.

Although the invention has been described herein with reference to an aerial vehicle, it nevertheless has applications in other arrangements and vehicles, such as watercraft (submersible or surface craft). For example, a watercraft may provide propulsion with a substantially submerged flapping wing or rotary propeller thrusters. The wing of a motor control system embodying the invention may therefore operate in any fluid (i.e. liquid or gas), e.g. water or air.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

Although certain example embodiments of the invention have been described, the scope of the appended claims is not intended to be limited solely to these embodiments. The claims are to be construed literally, purposively, and/or to encompass equivalents.

The invention claimed is:

1. A flight control system comprising:
at least one drive unit;
at least one wing operatively connected to the at least one drive unit; and
a controller configured to:
    send a control signal to the at least one drive unit to operate the at least one drive unit through a demanded motion;
    receive a feedback signal indicative of the actual motion of the at least one drive unit; and
    compare the actual motion to the demanded motion to determine a motion error of the at least one drive unit,
wherein the drive unit is a rotary drive unit configured to oscillate, and the motion is one of angular displacement, angular velocity, angular acceleration, rate of rotation and rotary acceleration.

2. A flight control system according to claim 1, wherein the at least one wing is connected to the at least one drive unit directly or via a gear arrangement.

3. A flight control system according to claim 1, wherein the at least one drive unit is configured to send a feedback signal indicative of the actual motion of the at least one drive unit to the controller.

4. A flight control system according to claim 1, further comprising an encoder associated with the at least one drive unit configured to send a feedback signal indicative of the actual motion of the at least one drive unit to the controller.

5. A flight control system according to claim 1, wherein the controller is further configured to:
    send a compensating signal to the at least one drive unit based on the motion error.

6. A flight control system according to claim 5, wherein the controller is configured to send a compensating signal to the at least one drive unit only if the determined motion error is greater than a predetermined value.

7. A flight control system according to claim 5, wherein the compensating signal is to operate the at least one drive unit through a compensating motion equal to the motion error.

8. A flight control system according to claim 5, wherein the controller is configured to send the control and compensating signals to the at least one drive unit during the same operation of the drive unit.

9. A flight control system according to claim 5, wherein the controller is configured to send the control signal during a first operation of the drive unit and to send the compensating signal during a subsequent operation of the wing.

10. A flight control system according to claim 1, wherein the wing is a substantially planar wing, pivotably connected to the rotary drive unit about a wrist axis which is angled with respect to the rotational axis of the rotary drive unit; optionally wherein the wrist axis is substantially perpendicular to the rotational axis of the rotary drive unit.

11. A flight control system according to claim 10, wherein the planar wing is confined to rotate about the wrist axis within a predetermined range.

12. A flight control system according to claim 1, wherein the controller is configured to operate the at least one drive unit through a plurality of operations, and to store the determined motion error for each operation.

13. A flight control system according to claim 1, comprising a plurality of drive units, the controller connected to each of said plurality of drive units, and configured to:

send a first control signal to a first drive unit to operate the first drive unit through a demanded motion;

receive a feedback signal indicative of the actual motion of the first drive unit;

compare the actual motion to the demanded motion to determine a motion error of the first drive unit; and send a second control signal to at least another of the plurality of drive units based on the motion error of the first drive unit.

14. A flight control system according to claim 1, comprising a plurality of drive units, the controller connected to each of said plurality of drive units, and configured to:

send a first control signal to each drive unit to operate each drive unit through a respective demanded motion;

receive a feedback signal indicative of the actual motion of each of the drive units; and compare the actual motion to the demanded motion of each drive unit to determine a motion error for each drive unit.

15. A flight control system according to claim 14, wherein the controller is further configured to compare the motion error for each drive unit to estimate, determine or categorise a cause of the motion error.

16. A flight control system according to claim 14, wherein the controller is configured to operate a plurality of drive units through a plurality of operations, and to store the determined motion error for each operation for each drive unit, the controller being further configured to compare the stored motion errors for one drive unit to the stored motion errors for another drive unit.

17. A flight control system according to claim 1, wherein the controller is configured to perform at least one of the following operations if the determined motion error is greater than a predetermined value:

a) send an alarm signal to a user;

b) prevent further operation of the at least one drive unit; and c) when the flight control system is operatively connected to a vehicle incorporating said at least one drive unit, sending a signal to the vehicle to proceed to a predetermined location.

\* \* \* \* \*